(12) United States Patent
Farell et al.

(10) Patent No.: US 8,042,326 B2
(45) Date of Patent: Oct. 25, 2011

(54) INTAKE AIR HEATER FOR ASSISTING DPF REGENERATION

(75) Inventors: Tracy M. Farell, Grand Blanc, MI (US); Julian C. Tan, Canton, MI (US); Sean Whitaker, Grosse Ile, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 840 days.

(21) Appl. No.: 12/019,092

(22) Filed: Jan. 24, 2008

(65) Prior Publication Data

US 2009/0044520 A1 Feb. 19, 2009

Related U.S. Application Data

(60) Provisional application No. 60/956,447, filed on Aug. 17, 2007.

(51) Int. Cl.
*F01N 3/00* (2006.01)

(52) U.S. Cl. ............... 60/295; 60/274; 60/280; 60/286; 60/297; 60/303; 180/65.1; 180/65.29; 180/65.285; 123/549; 123/554; 123/556

(58) Field of Classification Search ............ 60/274, 60/280, 285, 286, 295, 297, 300, 303, 311; 180/65.1, 65.26, 65.265, 65.29, 65.31; 123/549, 123/550, 554, 556

See application file for complete search history.

(56) References Cited

U.S. PATENT DOCUMENTS

| | | | | |
|---|---|---|---|---|
| 6,422,001 | B1 * | 7/2002 | Sherman et al. | 60/274 |
| 6,594,990 | B2 * | 7/2003 | Kuenstler et al. | 60/295 |
| 6,672,050 | B2 * | 1/2004 | Murata et al. | 60/284 |
| 6,912,848 | B2 * | 7/2005 | Bedapudi | 60/297 |
| 7,007,460 | B2 * | 3/2006 | Frieden et al. | 60/284 |
| 7,392,652 | B2 * | 7/2008 | Heath | 60/297 |
| 7,631,491 | B2 * | 12/2009 | Lange | 60/295 |
| 7,762,062 | B2 * | 7/2010 | Opris | 60/295 |

FOREIGN PATENT DOCUMENTS

| | | |
|---|---|---|
| CN | 1405435 A | 3/2003 |
| DE | 3601784 A1 | 7/1987 |
| DE | 3909932 A1 | 9/1990 |
| DE | 69124227 T2 | 6/1997 |
| DE | 102005059815 A1 | 6/2007 |
| EP | 0603907 A2 | 6/1994 |
| JP | 4101010 A | 4/1992 |

* cited by examiner

*Primary Examiner* — Binh Q. Tran
(74) *Attorney, Agent, or Firm* — Quinn Law Group, PLLC

(57) ABSTRACT

An apparatus and a method for enhancing diesel engine performance is provided. At low engine load and cold ambient temperatures, an intake air heater increases the engine load via an engine alternator, which in turn, enables the engine to burn more fuel by the process of combustion. The combusted fuel elevates exhaust gas temperatures, which thereby accommodates cold start, controls white smoke, and aids DPF regeneration.

19 Claims, 1 Drawing Sheet

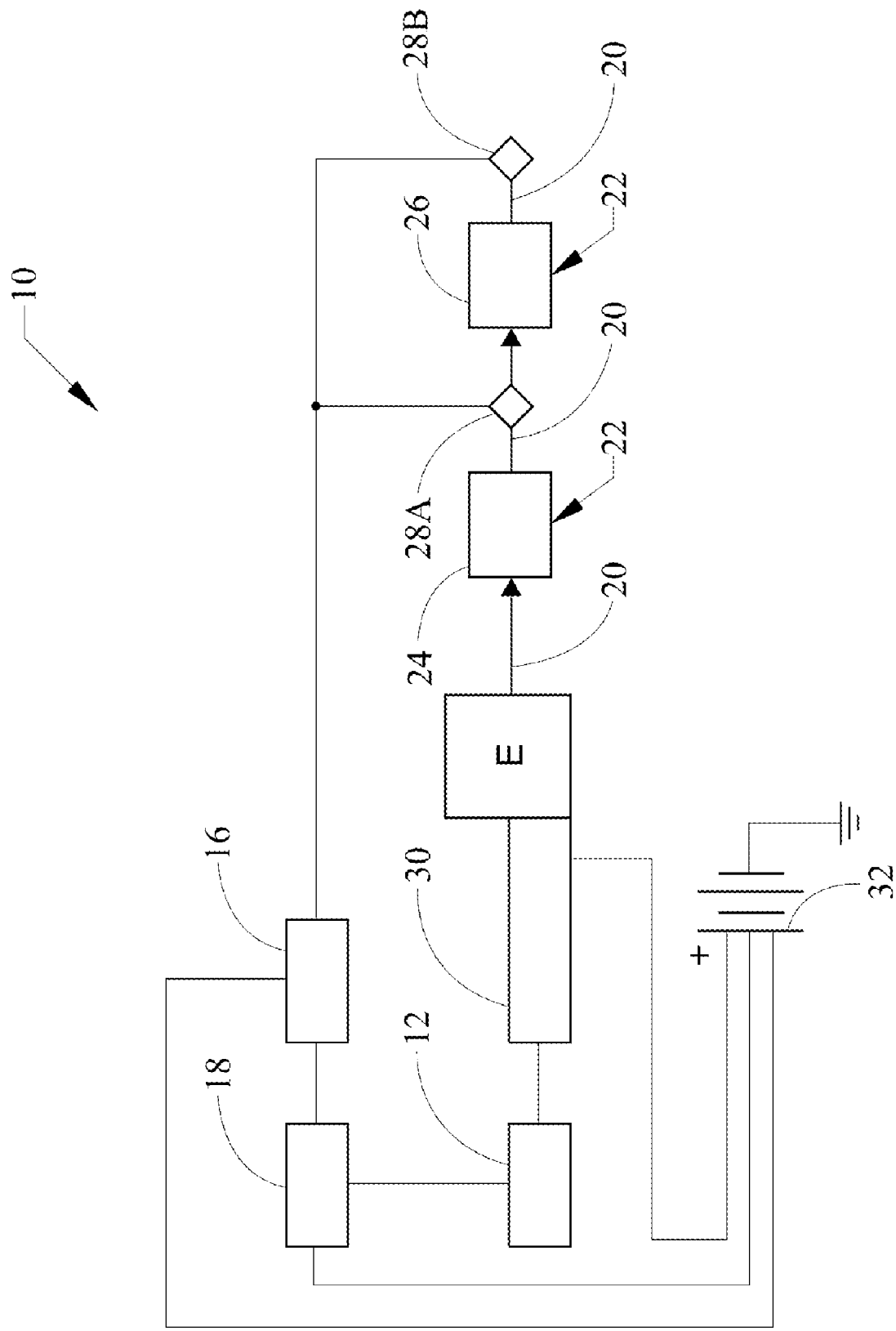

INTAKE AIR HEATER FOR ASSISTING DPF REGENERATION

CROSS REFERENCE TO RELATED APPLICATION

This application claims the benefit of U.S. Provisional Patent Application No. 60/956,447, filed Aug. 17, 2007, and which is hereby incorporated by reference in its entirety.

TECHNICAL FIELD

This invention relates to an intake air heater designed to aid engine ignition during cold weather conditions, prevent white smoke, and support DPF regeneration.

BACKGROUND OF THE INVENTION

Diesel powered engines are typically ignited by a mixture of injected fuel and hot compressed air. While external ignition devices (e.g., spark plugs) are not required, cold weather conditions pose substantial difficulties with respect to starting diesel engines. That is, as ambient temperatures decrease, the temperature of the internal combustion chamber may not be high enough to effectuate proper ignition of the injected fuel. Accordingly, various starting aids are commonly incorporated within diesel powered vehicles in order generate a sufficient amount of heat to initiate ignition.

One preferred method for facilitating ignition within diesel engines involves the employment of glow plugs. Generally, glow plugs are disposed within each combustion chamber of the diesel engine, and in operation, they effectively heat the combustion chamber.

An additional issue attributed to diesel engines running at low ambient temperature conditions concerns undesirable exhaust emissions, such as "white smoke." White smoke can be attributed to the release of unburned hydrocarbons as a result of misfire or incomplete combustion within the engine. Low temperature ambient air and low engine loads operate to reduce the temperature of the charge mixture within the engine to a degree that the combustion event becomes unstable.

Diesel engines must also be designed to combat unburned soot particles resulting from incomplete combustion. As such, most diesel engines feature a diesel particulate filter (DPF), i.e., a device designed to collect the particulate matter. However, as the quantity of particulate matter increases in the DPF, the DPF must be cleaned to restore its operability. The process of removing accumulated particulate matter from the DPF is most commonly referred to as regeneration. Regeneration involves the process of increasing the temperature of the DPF to about 550 degrees Celsius, such that the particulate matter combusts or burns. Typically, however, such a temperature is only achieved during high load and high engine speed conditions. As a result, when diesel engines operate at low loads, fuel may be injected in small amounts, and the temperature of the exhaust gas falls below regeneration levels.

Manufacturers have proposed various technologies for elevating exhaust gas temperatures to a level suitable for carrying out regeneration. For instance, it is known in the art to include catalysts for oxidizing the unburned components in the exhaust gas in order to elevate the exhaust gas temperature. Additionally, the exhaust gas temperature can be increased by a process known as post-injection. Post-injection refers to the method of providing additional fuel in the combustion chamber or exhaust gas system. The additional fuel does not burn in the engine cylinder, but rather, oxidizes with catalysts disposed in the exhaust pipe in order to increase exhaust gas temperature. Nevertheless, following a cold start, the engine may have to operate for over 100 seconds before a sufficient amount of heat energy is generated in order to initiate catalytic activity. To reduce this time, heating devices may be provided to introduce additional heat in the exhaust path.

SUMMARY OF THE INVENTION

In accordance with the present invention, a closed loop heating system designed to enhance diesel engine performance is provided. The closed loop heating system comprises an intake air heater adapted to accelerate the heating of exhaust gas in order to aid DPF regeneration. In response to a predetermined set of parameters pertaining to DPF regeneration, an engine control module (ECM) sends a representative signal to a high current control module (HCCM), thereby activating the intake air heater. As such, the intake air heater increases the engine load via an engine alternator, which in turn, enables the engine to burn more fuel by the process of combustion. The heat generated from the combustion event helps promote increased exhaust gas temperatures in order to support DPF regeneration.

Once the exhaust gas attains a predetermined temperature, the intake air heater is deactivated. However, in response to various factors necessitating DPF regeneration, the ECM activates additional exhaust gas temperature increasing means integrally adapted within the closed loop heating system.

The present invention further provides a method for enhancing diesel engine performance. More particularly, this invention presents a novel method of employing a heating device in order to load an alternator to support the regeneration of particulate matter accumulated in a diesel particulate filter. The method generally comprises the following steps: 1) sensing the temperature of exhaust gas emitted from the diesel engine; and 2) heating engine intake air via the heating device when the exhaust gas temperature is below a predetermined temperature. In accordance with the preferred embodiments, the heating device is operable to increase engine load via the alternator, wherein the increased engine load increases exhaust gas temperature. Accordingly, the increased exhaust gas temperature operates to support the regeneration of particulate matter trapped in the diesel particulate filter.

In an exemplary embodiment, the method can further include elevating exhaust gas temperatures by way of introducing additional unburned fuel in an exhaust pipe of the diesel engine. In one aspect, the additional unburned fuel can be introduced when the exhaust gas temperature is within a predetermined range. Alternatively, the additional unburned fuel can be introduced when the diesel particulate filter accumulates a predetermined quantity of particulate matter therein.

One advantage of the present invention is that the intake air heater is modified to support longer durations of 100 percent duty cycle in order to assist loading the alternator during DPF regeneration.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic block diagram illustrating a closed loop heating system according to a preferred embodiment of the present invention.

DESCRIPTION OF THE PREFERRED EMBODIMENTS

Referring generally to FIG. 1, a closed loop heating system 10 in accordance with the invention is illustrated as including an intake air heater 12 mounted to an intake manifold (not shown) of a diesel engine E. The diesel engine E comprises a combustion chamber (not shown) having fuel injection nozzles (not shown) for injecting fuel therein, wherein the injected fuel mixes with hot compressed air. In this manner, the air/fuel mixture burns within the combustion chamber, and the resulting exhaust gasses are discharged into an exhaust pipe 20.

The exhaust pipe 20 is adapted to transport the exhaust gas to an exhaust gas aftertreatment device 22 comprising a diesel oxidation catalyst (DOC) 24 disposed upstream of a diesel particulate filter (DPF) 26. The DOC 24 can include one of many structures known in the art, wherein a heat-resistant ceramic member such as, but not limited to, a cordierite honeycomb shaped body supports an oxidation catalyst on its surface. Analogously, the DPF 26 is a ceramic filter comprising one of many structures known in the art, such as, but not limited to, a cordierite honeycomb shaped body having a plurality of passages, the inlets and outlets of the adjoining passages being alternately closed.

As gas passes through the exhaust gas aftertreatment device 22, the DOC 24 oxidizes the hydrocarbons in the exhaust gases via a catalytic reaction, thereby increasing the temperature of the exhaust gas. Advantageously, the elevated exhaust gas temperature assists regeneration by increasing the temperature of the DPF 26, and as a result, the particulate matter trapped therein is removed.

Nevertheless, at light engine loads and/or low ambient temperatures, regeneration cannot occur if the temperature of the exhaust gas is insufficiently high to activate the catalytic reaction. Therefore, in order to prevent consequences attributed to considerable particulate matter buildup in the DPF 26, such as increased back pressure leading to reduced performance of the engine E, the exhaust gas temperature must be elevated. Numerous means known in the art can be employed for raising exhaust gas temperatures. However, the manner in which the temperature of the exhaust gas is elevated is directly dependent on the current exhaust gas temperature.

In order to monitor the temperature of the exhaust gas, one or more exhaust gas temperature sensors 28 can be disposed in the exhaust pipe 20. For instance, the exhaust gas temperature sensors 28A and 28B can be disposed upstream and/or downstream with respect to the DPF 26. Alternatively, only one exhaust gas temperature sensor 28A or 28B may be provided upstream or downstream of the DPF 26, wherein the temperature of the DPF 26 may be estimated from the output of the exhaust gas temperature sensor 28. The exhaust gas temperature sensors are operatively connected to an electronic control module (ECM) 16, wherein the exhaust gas temperature sensors are operatively configured to detect the temperatures of the inlet and outlet gas of the DPF 26, and output the respective temperatures to the ECM 16. Depending on a predetermined set of parameters, the ECM 16 may prompt the activation of one or more components integrally connected to the diesel engine E in order to carry out DPF regeneration.

The ECM 16 is operatively connected to the intake air heater 12 via a high current control module (HCCM) 18. Accordingly, when the ECM 16 detects that the exhaust gas temperature is below a predetermined temperature (e.g., but not limited to, 250 degrees Celsius), the ECM 16 commands the HCCM 18 to activate the intake air heater 12. However, it should be noted that since the HCCM 18 draws a considerable amount of current, an upper limit is imposed. In this manner, the HCCM 18 is designed such that if it exceeds a predetermined temperature (e.g., but not limited to, 90 degrees Celsius), its circuit board automatically shuts off. As a result, any request received by the HCCM 18 from the ECM 16 to activate the intake air heater 12 will be denied.

As illustrated in FIG. 1, the intake air heater 12 is directly linked to an alternator 30. The alternator 30 is mechanically linked with the diesel engine E. Upon activation, the intake air heater 12 draws a considerable amount of current, and applies an electrical load to the alternator 30. Yet due to the additional current dissipated from the engine's E battery 32, the alternator 30 increases engine load demand in order to recharge the battery 32. As the power level of the engine increases, additional fuel is combusted, thereby generating additional heat. Accordingly, this additional heat helps elevate the temperature of the exhaust gas, which in turn, aids DPF regeneration.

Once the exhaust gas has attained a predetermined elevated temperature (e.g., 250 degrees Celsius or greater), the ECM 16 triggers a command to the HCCM 18 to deactivate the intake air heater 12. As such, the intake air heater 12 is only operable when the exhaust gas is below a predetermined temperature (e.g., but not limited to, 250 degrees Celsius), which generally occurs at low ambient temperatures (e.g., but not limited to, 10 degrees Celsius and below). While the length of time in which the intake air heater 12 is engaged is relatively short, the overall time period is dependent, in part, on certain factors. For example, at increased engine loads and ambient temperatures, the duration of intake air heater activity is reduced.

In addition to utilizing the intake air heater 12, the ECM 16 enables alternative means for assisting in DPF regeneration. That is, since the engine has various operating states, the ECM 16 is functionally adapted to increase exhaust gas temperatures via additional means in response to certain factors pertaining to DPF regeneration. For instance, when the ECM 16 detects an exhaust gas temperature falling within a predetermined temperature range (e.g., but not limited to, 250 to 600 degrees Celsius), the ECM 16 triggers exhaust gas temperature increasing means such as, but not limited to, post-injection. In post-injection operation, unburned fuel that is injected into the exhaust pipe 20 is oxidized by the DOC 24, thereby elevating exhaust gas temperatures. Alternatively, the ECM 16 can be configured to activate post-injection (or other suitable exhaust gas temperature increasing means) upon detection of a predetermined quantity of particulate matter trapped in the DPF 26. Furthermore, electrical heating devices such as, but not limited to, glow plugs, may be employed for increasing exhaust gas temperatures.

The present invention further provides a method for enhancing performance of a diesel engine E. The method comprises: sensing exhaust gas temperature via means such as the sensors 28A, 28B discussed above; and activating a heating device, such as, but not limited to, the intake air heater 12 discussed above, to increase intake air when the exhaust gas temperature is below a predetermined temperature. The intake air heater 12 is operatively connected to the alternator 30 discussed above, wherein the alternator 30 is mechanically linked to the diesel engine E. When activated, the intake air heater 12 draws electrical energy from a power source such as the battery 32 discussed above, and as a result, increases alternator load demand for recharging the battery 32. The increased alternator load demand increases engine load, which increases the exhaust gas temperature. The increased exhaust gas temperature is operative to assist in regeneration of particulate matter accumulated in a mechanism for collecting particulate matter such as, but not limited to, the diesel particulate filter (DPF) 26 discussed above.

Preferably, the method further comprises deactivating the intake air heater 12 when the exhaust gas temperature attains a temperature equal to, or greater than, the predetermined temperature. In an exemplary embodiment, the method can include introducing fuel to the exhaust gas when the exhaust gas temperature is within a predetermined temperature range, wherein the fuel is operative to elevate the exhaust gas temperature. Additionally, the method can include introducing the fuel when the DPF 26 accumulates a predetermined quantity of particulate matter.

While the best modes for carrying out the invention have been described in detail, those familiar with the art to which this invention relates will recognize various alternative designs and embodiments for practicing the invention within the scope of the appended claims.

The invention claimed is:

1. A heating system comprising:
   an alternator mechanically linked to a diesel engine and configured to increase an engine load on the diesel engine to charge a battery;
   an intake air heater configured to provide an electrical load and wherein the intake air heater is operatively connected to the alternator and
   an exhaust gas aftertreatment device for regenerating particulate matter of exhaust gas emitted from the diesel engine;
   wherein the intake air heater is operatively configured to apply the electrical load to the alternator and wherein the alternator is configured to increase the engine load to charge the battery in response to receiving the electrical load from the intake air heater.

2. The heating system of claim 1, further comprising a control module operatively connected to the intake air heater and operable to activate and deactivate the intake air heater, the control module responsive to a predetermined set of parameters.

3. The heating system of claim 2, wherein the exhaust gas aftertreatment device comprises a diesel particulate filter for collecting the particulate matter.

4. The heating system of claim 3, wherein the exhaust gas aftertreatment device further comprises a diesel oxidation catalyst configured to oxidize hydrocarbons in the exhaust gas flowing therethrough, the diesel oxidation catalyst disposed upstream of the diesel particulate filter.

5. The heating system of claim 4, the intake air heater being operable to increase engine load via the alternator when exhaust gas temperature is below a predetermined temperature;
   wherein the increased engine load increases exhaust gas temperature; and
   wherein the increased exhaust gas temperature is operative to assist in regenerating the diesel particulate filter.

6. A closed loop heating system for enhancing performance of a diesel engine comprising:
   an intake air heater operatively configured to elevate temperature of exhaust gas emitted from the diesel engine, the intake air heater operable when the exhaust gas temperature is below a predetermined temperature;
   an alternator operatively connected to the intake air heater and operable to increase engine load, the alternator mechanically linked to the diesel engine; and
   an exhaust gas aftertreatment device including a diesel particulate filter, the exhaust gas aftertreatment device operatively configured to regenerate particulate matter of exhaust gas emitted from the diesel engine and transmitted to the diesel particulate filter.

7. The closed loop heating system of claim 6, further comprising a first control module operatively configured to activate and deactivate the intake air heater, the first control module responsive to control signals transmitted from a second control module operatively connected to the intake air heater.

8. The closed loop heating system of claim 7, further comprising at least one sensor for detecting the exhaust gas temperature, the at least one sensor operatively connected to the second control module and operable to output the exhaust gas temperature thereto.

9. The closed loop heating system of claim 8, wherein the exhaust gas aftertreatment device further includes a diesel oxidation catalyst configured to oxidize hydrocarbons in the exhaust gas flowing therethrough, the diesel oxidation catalyst disposed upstream of the diesel particulate filter.

10. The closed loop heating system of claim 9, wherein the first control module is a high current control module and the second control module is an electronic control module; and
    wherein the electronic control module is operatively configured to prompt the high current control module to activate the intake air heater when the exhaust gas temperature is below the predetermined temperature.

11. The closed loop heating system of claim 10, further comprising at least one electrical heating device operatively connected to the electronic control module and operable to increase the exhaust gas temperature.

12. The closed loop heating system of claim 10, wherein the electronic control module is operatively configured to increase the exhaust gas temperature via post-injection when the exhaust gas temperature is within a predetermined temperature range.

13. The closed loop heating system of claim 10, wherein the electronic control module is operatively configured to increase the exhaust gas temperature via post-injection when the diesel particulate filter accumulates a predetermined quantity of the particulate matter.

14. A closed loop heating system for assisting regeneration of an exhaust gas aftertreatment device including a diesel particulate filter to clean particulate matter in exhaust gas emitted from a diesel engine, comprising:
    an intake air heater operatively configured to elevate temperature of the exhaust gas emitted from the diesel engine, the intake air heater operable when the exhaust gas temperature is below a predetermined temperature;
    an alternator operatively connected to the intake air heater, the alternator mechanically linked to the diesel engine;
    a diesel oxidation catalyst for oxidizing hydrocarbons in the exhaust gas emitted from the diesel engine and flowing therethrough, the diesel oxidation catalyst disposed upstream of the diesel particulate filter;
    a high current control module for activating and deactivating the intake air heater, the high current control module responsive to control signals transmitted from an electronic control module operatively connected to the intake air heater; and
    at least one sensor for detecting the temperature of the exhaust gas, the at least one sensor operatively connected to the electronic control module and operable to output the exhaust gas temperature thereto;

wherein the intake air heater is further operatively configured to increase engine load via the alternator;

wherein the increased engine load promotes increased exhaust gas temperature; and wherein the increased exhaust gas temperature is operative to assist in regeneration of the diesel particulate filter.

15. A method for regenerating a diesel particulate filter comprising:

heating engine intake air by operating an intake air heater, which draws electrical energy from a battery, and results in increased alternator load demand for recharging the battery;

wherein the increased alternator load demand increases engine load, which increases engine exhaust temperature; and wherein the increased engine exhaust temperature is operative to assist in regeneration of the diesel particulate filter.

16. A method for supporting regeneration of a diesel particulate filter comprising:

sensing temperature of exhaust gas emitted from a diesel engine;

activating an intake air heater to increase engine load via an alternator when the exhaust gas temperature is below a predetermined temperature, the alternator mechanically linked to the diesel engine;

wherein the increased engine load increases the exhaust gas temperature; and wherein the increased engine exhaust temperature is operative to assist in regeneration of the diesel particulate filter.

17. The method of claim 16, further comprising deactivating the intake air heater when the exhaust gas temperature attains at least the predetermined temperature.

18. The method of claim 17, further comprising introducing fuel to the exhaust gas when the exhaust gas temperature is within a predetermined temperature range, the fuel operative to elevate the exhaust gas temperature.

19. The method of claim 17, further comprising introducing fuel to the exhaust gas when the diesel particulate filter accumulates a predetermined quantity of particulate matter, the fuel operative to elevate the exhaust gas temperature.

* * * * *